(No Model.)
H. W. FARLEY.
WIRE ROPE OR CABLE.
No. 388,656. Patented Aug. 28, 1888.
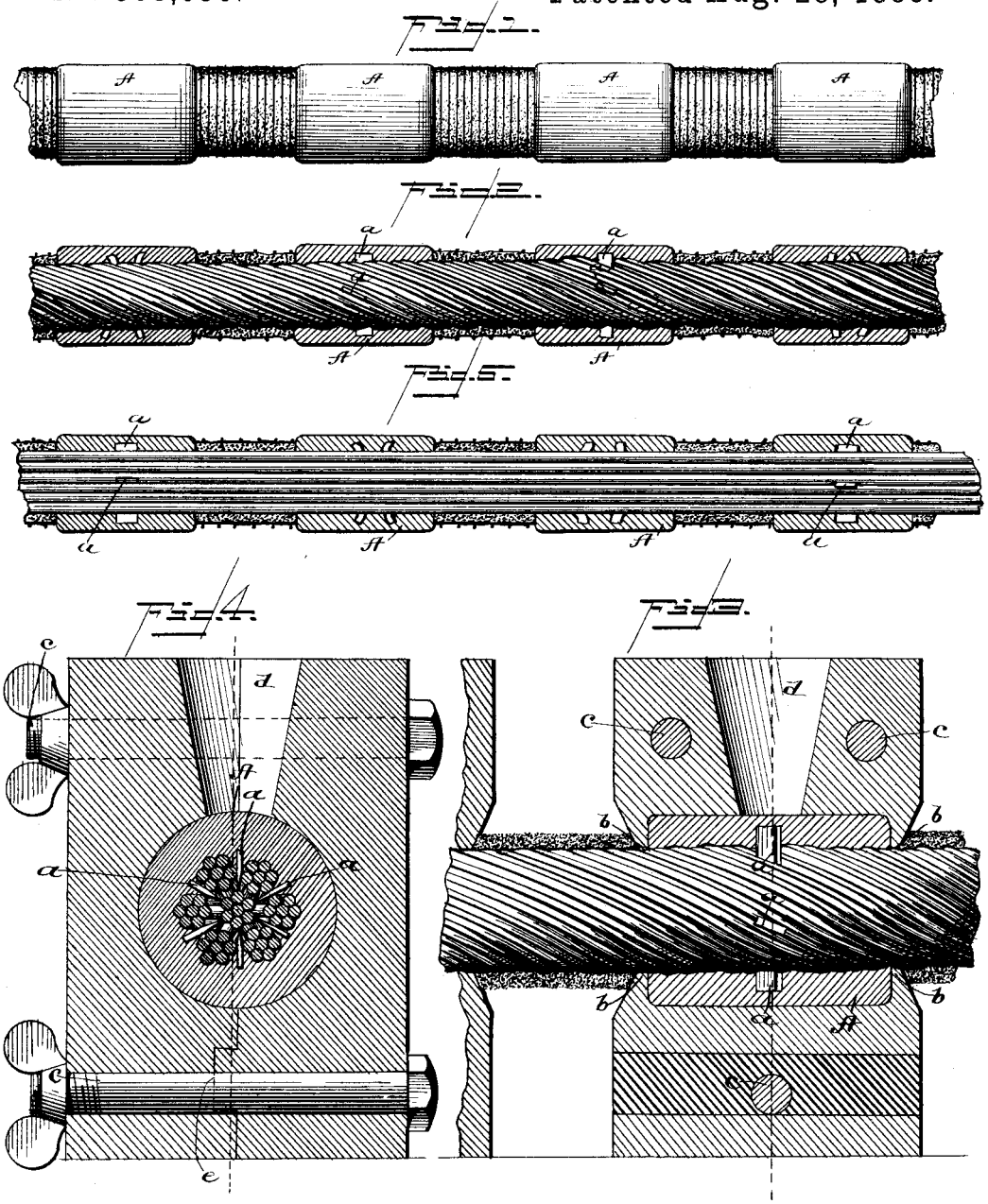
WITNESSES,
INVENTOR,
Henry W. Farley.
By Johnson and Johnson
his Attorneys.

UNITED STATES PATENT OFFICE.

HENRY W. FARLEY, OF URBANA, ILLINOIS.

WIRE ROPE OR CABLE.

SPECIFICATION forming part of Letters Patent No. 388,656, dated August 28, 1888.

Application filed May 3, 1888. Serial No. 272,676. (No model.)

*To all whom it may concern:*

Be it known that I, HENRY W. FARLEY, a citizen of the United States, residing at Urbana, in the county of Champaign and State of Illinois, have invented certain new and useful Improvements in Wire Ropes or Cables; and I do hereby declare the following to be a full, clear, and exact description of the invention, such as will enable others skilled in the art to which it appertains to make and use the same.

My invention relates to wire ropes or cables; and the object of my improvement is to prevent the wear upon the wire strands, and thus increase the safety and durability of the cable. I provide the rope at intervals with metal rings cast upon the wire strands and locked thereto in the casting operation, so that they will form the wear-surface. I prefer to apply my improvement to ropes formed of spirally laid or twisted strands, because the rings in being molded are thereby locked with the inequalities of the surface; but my improvement may be used as well with ropes formed of parallel strands, to which the rings may be locked in the casting operation. The locking of the rings is important to prevent them from having endwise motion, while such locking also prevents them from turning upon the rope. For this purpose I may drive pins or keys into the rope between the strands, so that they will project from the surface sufficiently to be embedded within the molded ring. Between the rings I prefer to tie the rope with cotton waste as a means for holding oil for the purpose of keeping the rope pliable and excluding dirt.

The accompanying drawings illustrate my invention in wire ropes, and I have shown one way in which I propose to cast the rings upon the rope, and in which—

Figure 1 represents a piece of spirally-made wire rope with metal rings cast thereon. Fig. 2 is a similar view showing the metal rings in section and locked or keyed to the rope. Fig. 3 shows a piece of wire rope and the way in which the ring is cast thereon, and Fig. 4 shows a cross-section of the same. Fig. 5 represents a view similar to Fig. 2, showing my improvement applied to a rope of parallel wires.

The rope may be either of twisted or parallel strands of wire, as my improvement can be applied to either construction. At equal distances apart I cast upon the rope metal rings A, which are about two inches long and separated about one and a half inch for a rope, say, one inch in diameter, and for which size the rings may be about one quarter of an inch thick; but the proportions of the rings will vary with the size of the rope and the conditions of the service, and their distance apart may also vary to give the required flexibility. I prefer to round the corners at the ends of the rings to give easy movement over the pulleys, and as a cable for street-cars or hoisting purposes the rope will, by being incased within these fixed rings, be prevented from wear and will thereby be rendered more durable. The rings should have a fixed relation to the rope, and for this purpose I drive into the rope metal wedges $a$, so as to project beyond the surface of the rope, as seen in Figs. 3 and 4, at the points where the rings are to be cast, and for this purpose I may use two or more wedges, so as to form a series of points or projections over which the rings are cast and thereby locked from endwise movement and from turning upon the rope. In addition to these locking projections, the inequalities in the surface of the rope into which the metal will flow will form locks; and I may form the locks by cutting two or more of the wire strands and turning out their ends, so that the metal would run about them and become solid with them. I prefer, however, to drive wedges in between the strands, because such driving tends to open them and to bulge them, and thus make the rope larger at such points than at the ends of the ring, so that the metal will flow in between the strands and the ring will become solid therewith.

I propose to cover the rope between the rings with wool or cotton waste filled with oil and bound by wire for the purpose of lubricating and keeping the rope pliable and free from dust and dirt, so that the rope will be practically incased by a flexible and a non-flexible covering, in which the former will be protected from wear by the latter. The binding of the flexible covering need be only sufficient to perfectly secure the wrapping, so that the strands between the rings shall be free to flex easily with the covering.

I may use any suitable mold and method of casting the rings upon the rope. The mold shown is a single one for casting one ring at a time; but I may use several connected molds in one casting. The mold shown is in two sections, each section being formed with a registering semicircular cavity, so that when the two sections are joined upon the rope they will form a cylindrical chamber around the rope, within which the ring is cast upon the rope. The formation of this chamber leaves a ridge, $b$, which forms the bearings of the mold upon the rope; but as the joint at these bearing-ridges is more or less open by reason of the inequalities of the surface of the rope, I provide for closing them to prevent the metal from running out by placing a packing of sand or plaster-of-paris around the joints $b$, as seen in Fig. 3. After the molding, this joint-packing is removed.

The sections of the mold, when joined, are clamped by bolts $c$ or other suitable means, and the mold is provided with an opening, $d$, extending from the top to the ring-forming chamber for pouring in the molten metal.

The sections of the mold may have a registering-lock, $e$, to keep them in coincident relation when clamped upon the rope.

I claim—

1. A wire rope or cable having an inclosing-covering of alternate metallic and flexible abutting sections.

2. A wire rope or cable having incasing-rings molded upon the strands thereof and locked thereto by projections applied to the rope, substantially as described.

3. A wire rope or cable having metal rings cast upon the strands thereof at suitable distances apart in fixed relation thereto, and having a bound covering of flexible lubricating material between the said rings, whereby the entire surface of the rope is covered by alternating metal and non-metallic casing, substantially as described, for the purpose specified.

4. A wire rope or cable having metal rings cast upon the strands thereof and in fixed relation thereto at suitable distances apart, and having a flexible material bound upon the unringed surface of the rope of a diameter less than that of the said rings, whereby the said flexible covering is protected from wear, as herein set forth.

5. A wire rope or cable having metal rings cast upon the strands thereof at suitable distances apart, and locked in relation thereto by metal pins or wedges driven into the rope between its strands and projecting from its surface into the metal of the ring, substantially as described.

6. The improved article of manufacture herein described, consisting of a wire rope having metal rings cast upon the surface of the strands thereof at suitable distances apart, and having a lubricating material consisting of cotton waste bound upon the unringed parts by means of a wire tie, as herein set forth.

In testimony whereof I affix my signature in presence of two witnesses.

HENRY W. FARLEY.

Witnesses:
   CHAS. W. ROLFE,
   MATTIE F. ROLFE.